US010712275B2

(12) United States Patent
Rentzepis et al.

(10) Patent No.: US 10,712,275 B2
(45) Date of Patent: Jul. 14, 2020

(54) HAND-HELD SYNCHRONOUS SCAN SPECTROMETER FOR IN SITU DETECTION OF PATHOGENS AND MINERAL DEFICIENCY IN BLOOD

(71) Applicant: The Texas A&M University System, College Station, TX (US)

(72) Inventors: Peter M. Rentzepis, College Station, TX (US); Thomas Cesario, Newport Beach, CA (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 16/325,894

(22) PCT Filed: Aug. 25, 2017

(86) PCT No.: PCT/US2017/048719
§ 371 (c)(1),
(2) Date: Feb. 15, 2019

(87) PCT Pub. No.: WO2018/039624
PCT Pub. Date: Mar. 1, 2018

(65) Prior Publication Data
US 2019/0369024 A1    Dec. 5, 2019

Related U.S. Application Data

(60) Provisional application No. 62/380,041, filed on Aug. 26, 2016.

(51) Int. Cl.
*G01N 21/64* (2006.01)
*G01J 3/06* (2006.01)
(Continued)

(52) U.S. Cl.
CPC ............ *G01N 21/6486* (2013.01); *G01J 3/06* (2013.01); *G01J 3/18* (2013.01); *G01J 3/42* (2013.01);
(Continued)

(58) Field of Classification Search
CPC ...... G01J 2003/063; G01J 3/0272; G01J 3/06; G01J 3/10; G01J 3/18; G01J 3/42;
(Continued)

(56) References Cited

U.S. PATENT DOCUMENTS 4,609,821 A * 9/1986 Summers .............. E21B 49/005
250/255
5,422,719 A 6/1995 Goldstein
(Continued)

FOREIGN PATENT DOCUMENTS

| CA | 167740 S | 11/2016 |
|---|---|---|
| CA | 169795 S | 4/2018 |

(Continued)

OTHER PUBLICATIONS

Alarie, Jean Pierre et al.; "Development of a battery-operated portable synchronous luminescence spectrofluorometer"; Review of Scientific Instruments; vol. 64 No. 9; Sep. 1993; pp. 2541-2546.
(Continued)

*Primary Examiner* — Hina F Ayub
(74) *Attorney, Agent, or Firm* — Bulkley, Richardson and Gelinas, LLP; Mary R. Bonzagni, Esq.

(57) ABSTRACT

A hand-held synchronous scan spectrometer for in situ analysis of bacteria, viruses, and fungi includes a housing that contains a light source, a first monochromator positioned to receive light from the light source and operable to direct a wavelength of the light from the light source towards a sample, a second monochromator positioned to receive fluoresced light from the sample and light from first mono-
(Continued)

chromator, and a detector disposed within the housing and positioned to receive light output from the second monochromator. The hand-held synchronous scan spectrometer can include a display that is integrated into the housing or can utilize a display of a removable display device (e.g., a cell phone, PDA, tablet, and the like).

8 Claims, 11 Drawing Sheets

(51) Int. Cl.
*G01J 3/18* (2006.01)
*G01J 3/42* (2006.01)
*G01J 3/44* (2006.01)
*G01J 3/443* (2006.01)
G01J 3/02 (2006.01)
G01J 3/10 (2006.01)
G01N 21/65 (2006.01)

(52) U.S. Cl.
CPC ............ *G01J 3/443* (2013.01); *G01J 3/4406* (2013.01); *G01J 3/0272* (2013.01); *G01J 3/10* (2013.01); *G01J 2003/063* (2013.01); *G01N 21/65* (2013.01); *G01N 2021/6419* (2013.01); *G01N 2021/6421* (2013.01); *G01N 2201/0221* (2013.01); *G01N 2201/1293* (2013.01)

(58) Field of Classification Search
CPC ................ G01J 3/4406; G01J 3/443; G01N 2021/6419; G01N 2021/6421; G01N 21/6486; G01N 21/65; G01N 2201/0221; G01N 2201/1293
See application file for complete search history.

(56) References Cited

U.S. PATENT DOCUMENTS

| | | |
|---|---|---|
| 6,429,968 B1 | 8/2002 | Carver |
| 7,129,481 B2 | 10/2006 | Overney |
| 7,190,457 B2 | 3/2007 | Tabacco et al. |
| 7,192,783 B2 | 3/2007 | Alfano et al. |
| 7,491,366 B2 | 2/2009 | Tokhtuev et al. |
| 7,542,138 B2 | 6/2009 | Gardner, Jr. |
| 7,813,790 B2 | 10/2010 | de Josselin de Jong et al. |
| 7,916,834 B2 | 3/2011 | Piorek et al. |
| 8,269,174 B2 | 9/2012 | Gardner et al. |
| 8,502,168 B1 | 8/2013 | Poteet et al. |
| 9,207,175 B2 | 12/2015 | Yu et al. |
| 9,261,459 B1 | 2/2016 | Tokhtuev et al. |
| 9,557,268 B2 | 1/2017 | Morrow et al. |
| 9,841,380 B2 | 12/2017 | Wolf et al. |
| 9,915,603 B1 | 3/2018 | Hug et al. |
| 2004/0152203 A1 | 8/2004 | Alfano et al. |
| 2006/0106317 A1 | 5/2006 | McConnell et al. |
| 2006/0195022 A1* | 8/2006 | Trepagnier ............ A61B 5/0071 600/316 |
| 2008/0319324 A1* | 12/2008 | Maier .................. A61B 5/0059 600/477 |
| 2009/0101843 A1* | 4/2009 | Henshaw .................. G01J 3/28 250/484.4 |
| 2011/0117025 A1 | 5/2011 | Dacosta et al. |
| 2011/0222060 A1* | 9/2011 | Smith ........................ G01J 3/26 356/326 |
| 2012/0078524 A1* | 3/2012 | Stewart ................ A61B 5/0059 702/19 |
| 2016/0045114 A1 | 2/2016 | Dacosta et al. |
| 2016/0109423 A1 | 4/2016 | Reichl et al. |
| 2016/0287211 A1 | 10/2016 | DaCosta et al. |
| 2017/0176255 A1* | 6/2017 | Nciri ......................... G01J 3/42 |
| 2017/0236281 A1 | 8/2017 | Dacosta |
| 2017/0252440 A1 | 9/2017 | Wu et al. |
| 2017/0307528 A1* | 10/2017 | Atzler ................ G01N 21/6428 |
| 2018/0242848 A1 | 8/2018 | Dacosta et al. |
| 2018/0325377 A1 | 11/2018 | Dacosta et al. |

FOREIGN PATENT DOCUMENTS

| | | |
|---|---|---|
| CA | 174402 S | 4/2018 |
| CA | 174403 S | 4/2018 |
| CA | 174404 S | 4/2018 |
| CA | 174405 S | 4/2018 |
| WO | WO-2004/070330 A1 | 8/2004 |

OTHER PUBLICATIONS

Ebenezar, Jeyasingh et al.; "Synchronous Fluorescence Spectroscopy for the Detection and Characterization of Cervical Cancers In Vitro"; Photochemistry and Photobiology; vol. 86; 2010; pp. 77-86.
Zekovic, Ivana et al.; "Classification of Intact Cereal Flours by Front-Face Synchronous Fluorescence Spectroscopy"; Food Analytical Methods; vol. 5 No. 5; Jan. 17, 2012; pp. 1205-1213.
Hargis, Philip J. et al.; "Ultraviolet fluorescence identification of protein, DNA, and bacteria"; Proc. SPIE; vol. 2366; Feb. 10, 1995; 8 pages.
Li, Yao-Qun et al.; "Synchronous Fluorescence Spectroscopy and Its Applications in Clinical Analysis and Food Safety Evaluation"; Reviews in Fluorescence; 2010; pp. 95-117.

* cited by examiner

HAND-HELD SYNCHRONOUS SCAN SPECTROMETER FOR IN SITU DETECTION OF PATHOGENS AND MINERAL DEFICIENCY IN BLOOD

CROSS REFERENCES TO RELATED APPLICATIONS

This application claims the benefit under 35 U.S.C. § 119(e) of U.S. Provisional Patent Application No. 62/380,041, filed Aug. 26, 2016, which is incorporated herein by reference in its entirety as if fully set forth herein.

BACKGROUND

It is estimated that 2 million healthcare infections occur each year in the United States alone, causing 90,000 deaths. Treatment of these infections is estimated by the CDC to cost $5 billion per year. Usually, antibody and other chemical detection methods have made it possible to identify several thousand bacteria species. However, accurate as these methods are, they tend to suffer from the long periods of time required for identification. Long-time bacteria detection and characterization times may compromise the effectiveness of chemotherapy and can allow the infection to increase. Further, the long-time detection may allow the bacteria to develop immunity.

Several methods have been proposed for the identification of bacteria strains, these include differences in the spectra of viable bacteria, fluorescence and IR spectroscopy, and chemiluminescence. Fluorescence spectroscopy has identified *Escherichia coli* and *Staphylococcus aereus*, and some 25 strains have been also identified by their fluorescence spectra excited at 250 nm. Auto-fluorescence has also been employed for the rapid detection and classification of bacteria. Similarly, bacteria rapid identification has been reported using principal component analysis. In addition, the identification of bacteria in culture plates and liquids has been reported. These methods have been successful in the identification of many viable bacteria strains in various media, which not only minimizes the period of time required for identification and classification of bacteria, but also provides an easy and rather inexpensive means for the identification of bacteria.

SUMMARY

The objective of the present study is the development of a method that identifies bacteria strains (and distinguishes between dead and alive bacteria), fungi, and viruses in situ within a very short time period. This method is based on the detection and analysis of the synchronous fluorescence spectra of bacteria before and after UV irradiation. To that effect, a hand-held device is disclosed that is capable of recording and analyzing synchronous fluorescence, thus providing in situ and practically instantaneously the ratio of live:dead bacteria. It is expected that such methods will be extended to the identification of the bacteria present at infection sites of emergency rooms and field wounds. Knowledge of the bacteria-strain and the effectiveness of on-site bacteria inactivation is expected to drastically decrease wound and out-of-clinic bacterial population growth and increase healing.

In a typical embodiment, a hand-held synchronous scan spectrometer includes a synchronous monochromator, one or more laser diode(s), a charge coupled device (CCD), and a display. In a typical embodiment, the display is integrated into the hand-held synchronous scan spectrometer. In other embodiments, the display may be a stand-alone or removable display (e.g., a monitor, mobile device, tablet, phone, etc.). Fluorescence is induced by light emitted by a laser diode or LED and transmitted through a fiber to the infected area that is to be analyzed. The fluorescence is collected by a fiber and transmitted to the slit of the synchronous monochromator which disperses the fluorescence onto the CCD for recording the spectrum and analysis. The synchronous fluorescence spectrum is displayed on top of the device with identification of alive and dead bacteria and their amounts. In a typical embodiment, the instrument includes two grating(s) monochromators. Experiments have been performed which suggest that this device can provide the synchronous spectra necessary for the in situ identification of pathogens within 5 minutes.

In an embodiment, a hand-held synchronous scan spectrometer for in situ analysis of bacteria, viruses, and fungi, the hand-held synchronous scan spectrometer includes a housing, a light source disposed within the housing, a first monochromator disposed within the housing and positioned to receive light from the light source and operable to direct a wavelength of the light from the light source towards a sample, a second monochromator disposed within the housing and positioned to receive fluoresced light from the sample and light from first monochromator, and a detector disposed within the housing and positioned to receive light output from the second monochromator.

In some embodiments, the hand-held synchronous scan spectrometer includes a stepping motor and a microcontroller that are operable to control at least one of a wavelength of light output from the first monochromator and an intensity of the light source.

In some embodiments, the hand-held synchronous scan spectrometer includes a lens that is positioned between the light source and the first monochromator and adapted to direct light from the light source to an entry slit of the first monochromator.

In some embodiments, the hand-held synchronous scan spectrometer includes a beam splitter positioned between a light path from the first monochromator and the sample and a lens that is positioned between the first monochromator and the beam splitter and adapted to direct light from the second monochromator to the beam splitter. The beam splitter is oriented to direct a first beam of light toward the sample and a second beam of light towards the second monochromator.

In some embodiments, the hand-held synchronous scan spectrometer includes an optical fiber that directs light between the sample and the beam splitter.

In some embodiments, the hand-held synchronous scan spectrometer includes a lens positioned between the beam splitter and the second monochromator to direct light from the beam splitter to an entry slit of the second monochromator.

In some embodiments, the detector of the hand-held synchronous scan spectrometer comprises a CCD.

In some embodiments, the detector of the hand-held synchronous scan spectrometer comprises a spectrometer adapted for synchronous fluorescence spectrum analysis.

In some embodiments, the hand-held synchronous scan spectrometer includes a display disposed on an outside the housing.

In some embodiments, the hand-held synchronous scan spectrometer includes a docking cradle disposed on an outside of the housing and the display is a part of a removable display device that docks with the hand-held synchronous scan spectrometer via the docking cradle.

A method of detecting bacteria, viruses, or fungi, the method includes analyzing, using a hand-held synchronous scan spectrometer, a sample placed into a sample holder. The hand-held synchronous scan spectrometer includes a housing, a light source disposed within the housing, a first monochromator disposed within the housing and positioned to receive light from the light source and operable to direct a wavelength of the light from the light source towards a sample, a second monochromator disposed within the housing and positioned to receive fluoresced light from the sample and light from first monochromator, and a detector disposed within the housing and positioned to receive light output from the second monochromator. The analyzing includes transmitting light from the light source to the first monochromator, outputting a wavelength of light from the first monochromator to the sample, directing fluoresced light from the sample and light from the monochromator to the second monochromator, outputting a wavelength of light from the second monochromator to the detector, and recording, using a CCD associated with the detector, a spectrum of the wavelength of light from the second monochromator.

In some embodiments, the method includes outputting the wavelength of light from the first monochromator comprises directing the wavelength of light to the sample via an optical fiber; and directing the fluoresced light from the sample comprises directing the fluoresced light through the optical fiber to a beam splitter.

In some embodiments, the method includes displaying results of the analyzing on a display. In some embodiments, the display is integrated into the housing of the hand-held synchronous scan spectrometer. In some embodiments, the display is a part of a removable display device that docks with the hand-held synchronous scan spectrometer via the docking cradle. In some embodiments, the results comprise information identifying a type of bacteria. In some embodiments, the results comprise information regarding an amount of live bacteria and an amount of dead bacteria. In some embodiments, the method includes adjusting, with a stepping motor and a microcontroller, a wavelength of light output from the first monochromator. In some embodiments, the method includes adjusting, with a stepping motor and a microcontroller, an intensity of the light source.

BRIEF DESCRIPTION OF THE DRAWINGS

A more complete understanding of embodiments of the present invention may be obtained by reference to the following Detailed Description when taken in conjunction with the accompanying Drawings wherein.

DETAILED DESCRIPTION OF EXEMPLARY EMBODIMENTS

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

As used herein, the terms connect, connection, connected, in connection with, and connecting may be used to mean in direct connection with or in connection with via one or more elements. Similarly, the terms couple, coupling, coupled, coupled together, and coupled with may be used to mean directly coupled together or coupled together via one or more elements. Terms such as up, down, top and bottom and other like terms indicating relative positions to a given point or element may be utilized to more clearly describe some elements. Commonly, these terms relate to a reference point such as ground level.

Figure 1:
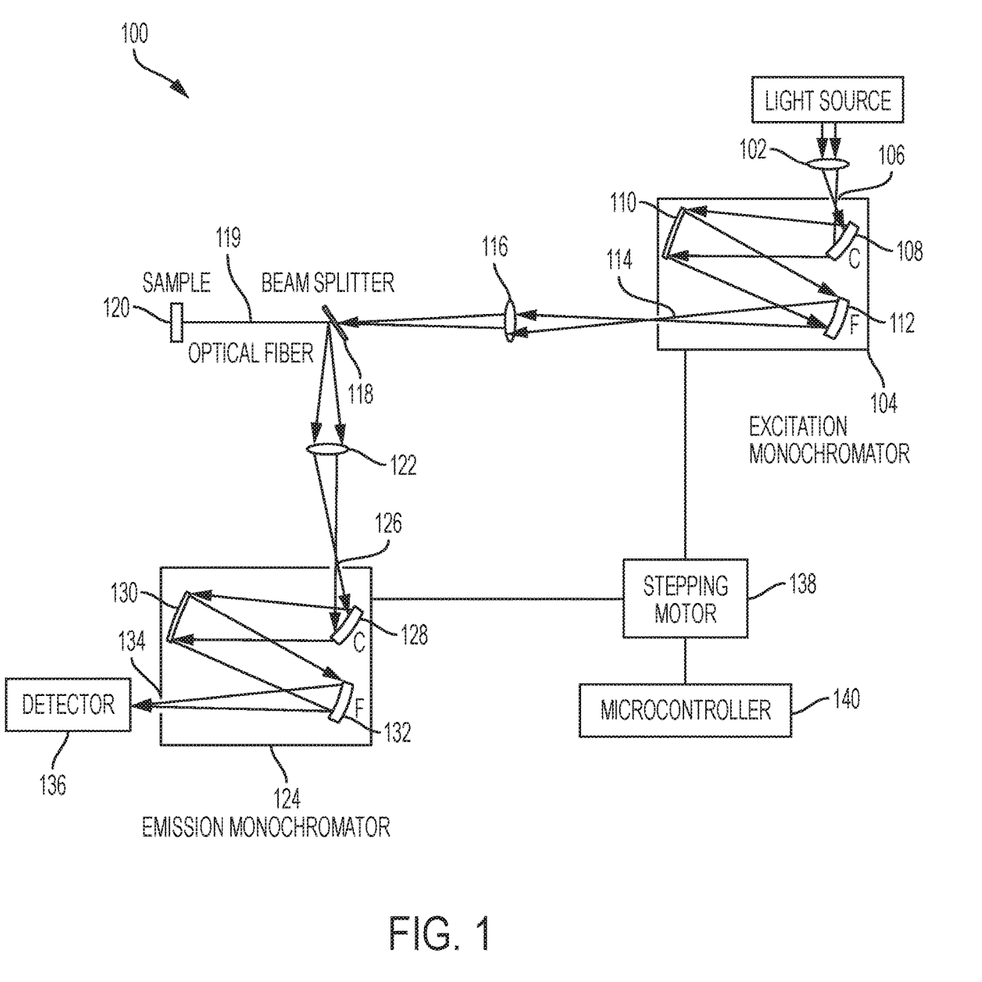
FIG. 1 is a schematic representation of a hand-held synchronous scan spectrometer.

FIG. 1 is a schematic of a hand-held synchronous scan spectrometer 100. The spectrometer 100 of FIG. 1 includes a first monochromator 104, a second monochromator 124, a stepping motor 138 and a microcontroller 140. The first monochromator 104 is adapted to receive light from a light source 101 and output a desired wavelength from the light source 101 toward a sample 120. Light that fluoresces off of the sample is collected and directed to the second monochromator 124 which subsequently outputs a portion of the light passing therethrough to a detector 136 for analysis. The stepping motor 138 and the microcontroller 140 are operable to control parameters of the analysis process, such as, for example, wavelength output by the first and second monochromators, an intensity of the light source, etc. In a typical embodiment, the stepping motor 138 controls movement of the gratings to adjust parameters of the light output and the microcontroller 140 controls steps Δλ of the excitation. The spectrometer 100 is described in more detail below.

In a typical embodiment, the spectrometer 100 includes a lens 102 that directs light into an entry slit 106 of a first monochromator 104. Light that has entered into the first monochromator 104 is directed towards a collimating mirror 108. The collimating mirror 108 reflects the light towards a diffraction grating 110 that disperses the light into different wavelengths. The dispersed light is reflected by the diffraction grating 110 towards a focusing mirror 112 that reflects and focuses a desired wavelength of the dispersed light out of the first monochromator 104 through an exit slit 114.

Upon exiting the first monochromator 104, the desired wavelength of the dispersed light is directed towards a lens 116 that focuses the desired wavelength of the dispersed light upon a beam splitter 118. The beam splitter 118 splits the incoming light into two beams: a first beam that is directed towards a sample 120 and a second beam that is directed towards a lens 122. In a typical embodiment, the first beam is guided to the sample 120 via an optical fiber 119. Fluoresced light from the sample 120 is directed back to the beam splitter 118 via the optical fiber 119 and is reflected towards the lens 122.

Both the second beam and the fluoresced light from the sample 120 are directed by the lens 122 towards an entry slit 126 of a second monochromator 124. The second monochromator 124 directs light in a similar fashion to that of the first monochromator 104. Light that enters the entry slit 126 is directed to a collimating mirror 128. Light that reflects from the collimating mirror 128 is directed to a diffraction grating 130 that disperses the light into different wavelengths. The dispersed light is reflected by the diffraction grating 130 towards a focusing mirror 132 that reflects and focuses a desired wavelength of the dispersed light out of the second monochromator 124 through an exit slit 136 towards a detector 136. The detector 136 analyzes the incoming light and determines, for example, what kind of bacteria are present. Operation of the detector 136 is discussed in more detail below. In a typical embodiment, the detector 136 includes a CCD for recording the spectrum and analysis.

Working Examples

Bacteria strains of *Escherichia coli* and *Rhodococcus* were maintained at 4° C. until use, and were placed in ice during the experimental periods. For UV irradiation and recording of the absorption and emission spectra, the bacteria were diluted to a concentration of $10^7$/ml and placed in a 1 cm optical-path-length quartz cell. The absorption and fluorescence spectra were recorded by Shimadzu UV-VIS spectrometers. For synchronous spectra, the excitation wavelength interval, $\Delta\lambda$, was determined by the wavelength separation between the maxima of the excitation and fluorescence spectral bands ($\lambda_{exc}$ and $\lambda_{em}$, respectively) of each bacteria sample, usually $\Delta\lambda$ is about 3-6 nm. In this procedure, a synchronous spectrum is recorded by scanning simultaneously the excitation wavelength, $\lambda_{exc}$, and emission wavelength, $\lambda_{em}$, while keeping $\Delta\lambda$ constant. This spectroscopic method is advantageous for distinguishing the spectra of individual molecules in a mixture of several molecules of similar type. This distinction becomes possible because the synchronous fluorescence technique, simplifies the fluorescence analysis by narrowing the spectral band widths while minimizing the time required for complete multi-component analysis. This technique has been employed successfully in several areas, including forensics, pollution, and the identification of a large number of organic compounds in oil.

Synchronous fluorescence is based on the fact that the intensity of emission depends on the principle that excitation wavelength $\lambda$ is a multiplicative parameter in emission spectroscopy. Namely:

$$I(\lambda)=kR_\lambda E_{em}(\lambda) \qquad \text{Equation (1)}$$

Where: $I(\lambda)$=emission intensity at $\lambda$, $R_\lambda$=spectral radiance emission excited at $\lambda'$. $E_{em}(\lambda)$=emission spectrum. The synchronous emission intensity $I_s$ is given as:

$$I_s=kclE_{exc}(\lambda-\Delta\lambda)E_{em}(\lambda) \qquad \text{Equation (2)}$$

Where kc and $\Delta\lambda=\lambda-\lambda'$, are constant and $E_{exc}(\lambda')$=excitation spectrum; l is the length of the cell.

Equation (2) suggests that in the synchrony technique the emission intensity is a function of both $\lambda$ and $\lambda'$, where the function $E_{esc}(\lambda')$ and $E_{em}(\lambda)$ are both involved in recording the spectra rather than just one of them as is the case of conventional emission methods. The selectivity of $\Delta\lambda$ provides another degree of selectivity that is not available in conventional excitation methods. The synchronous scan method generates spectra where the broad, mostly structure less fluorescence band of a mixture of various molecules is reduced to peaks that correspond and identify the constituent molecules in the mixture.

Figure 2:
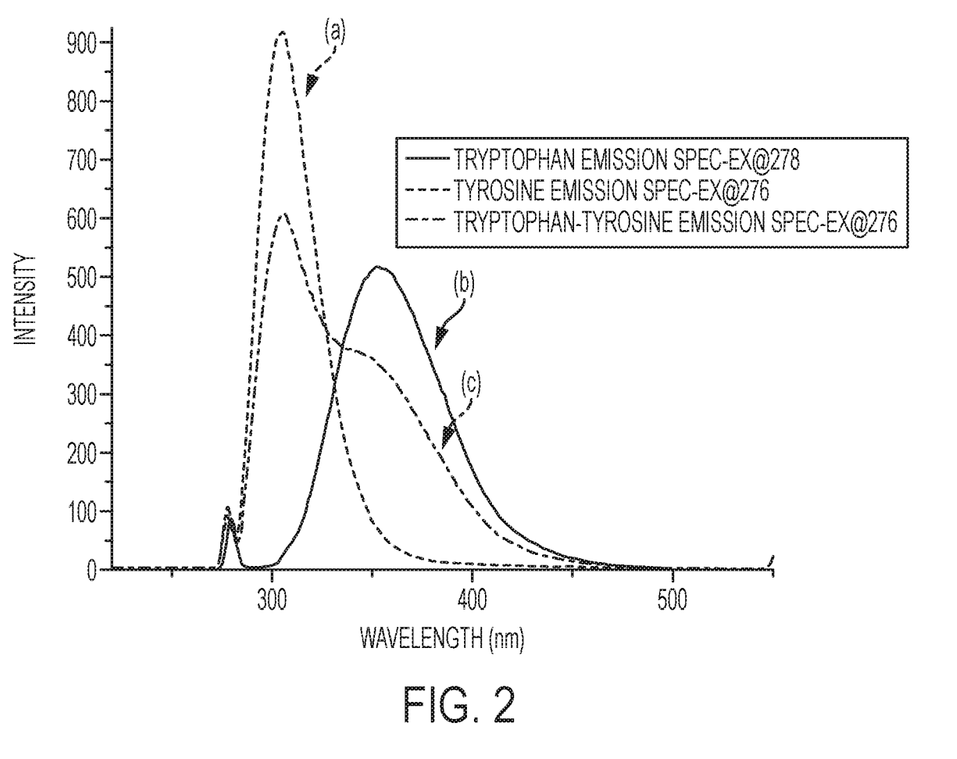
FIG. 2 is a graph showing synchronous fluorescence spectra of a) tyrosine, b) tryptophan, and c) a solution of both tyrosine and tryptophan.

The advantage of the synchronous scan fluorescence in conjunction with principal component analysis, PCA, is the ability to distinguish the spectrum of individual molecular components in a mixture. FIG. 2 is a graph showing synchronous fluorescence spectra of a) tyrosine, b) tryptophan, and c) a solution of both tyrosine and tryptophan. The normal fluorescence spectrum does not distinguish between the two molecules. In contrast, the spectrum of the synchronous scan depicts clearly the components of tyrosine and tryptophan. The synchronous scan method is utilized to distinguish several components of *E-coli* and *Rhodococcus* bacteria. This information allows one to determine the mechanism of bacteria inactivation by UV light irradiation or other means of bacteria inactivation, and, in addition, determine the alive/dead bacteria ratio in PBS and plasma.

Similarly, iron has been detected in samples. However, a more important application of the method rests on the fact that components of blood and bacteria types can be detected in situ within a few minutes rather than relying on a lab blood analysis and 24-hour incubation of bacteria before counting the colonies forming units ("CFU"). To perform this detection and analysis in situ, the hand-held synchronous scan spectrometer is capable of recording the synchronous fluorescence spectra of bacteria in a variety of places, such as, for example, hospital emergency rooms, field clinics, and wounds in general.

Figure 3:
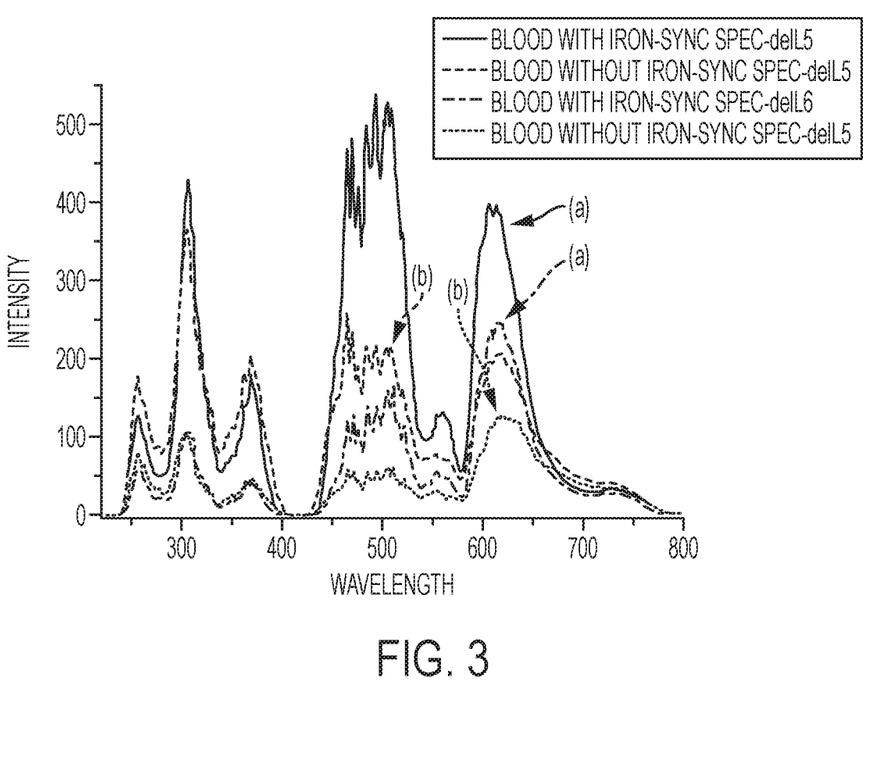
FIG. 3 is a graph showing synchronous fluorescence spectra of a) normal and b) iron free blood.

FIG. 3 shows synchronous spectra of a mixture of normal blood with iron (denoted (a)) and a sample of blood that does not contain iron (denoted as (b)). Inspection of FIG. 3 shows that the ratio of the iron containing band maxima are higher than the ratio of anemic blood. From this ratio one can identify and determine the extent of the iron deficiency.

Figure 4:
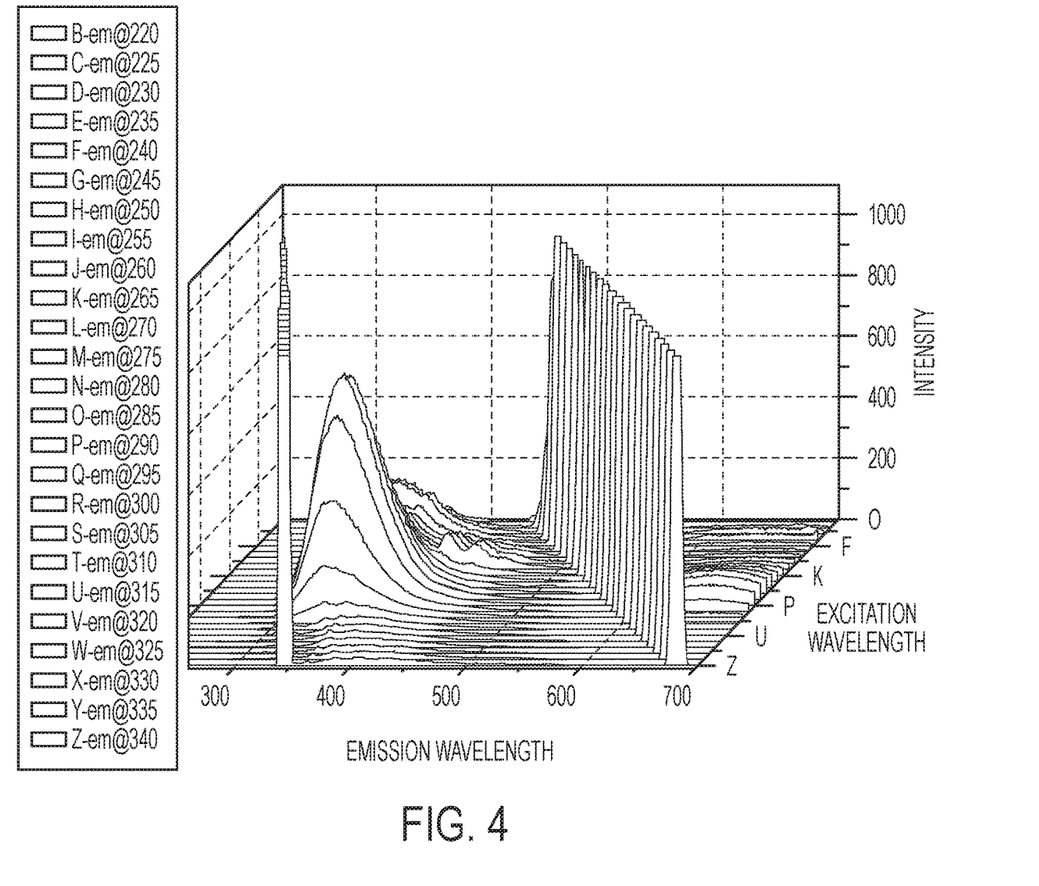
FIG. 4 is a graph showing 3D synchronous spectra of *E-coli* bacteria showing emission of components of the bacteria.

FIG. 4 displays the 3D synchronous fluorescence spectra of *E. coli* bacteria where the spectra of several components are evident. Using the hand-held synchronous-scan spectrometer the identity and concentration of bacteria in wounds or clinics and the iron deficiency in blood of participants in athletic events, troops in training, and other vigorous endeavors can be determined in the field within a very short period of time rather than waiting long periods of time for off-site laboratory evaluation.

Figure 5:
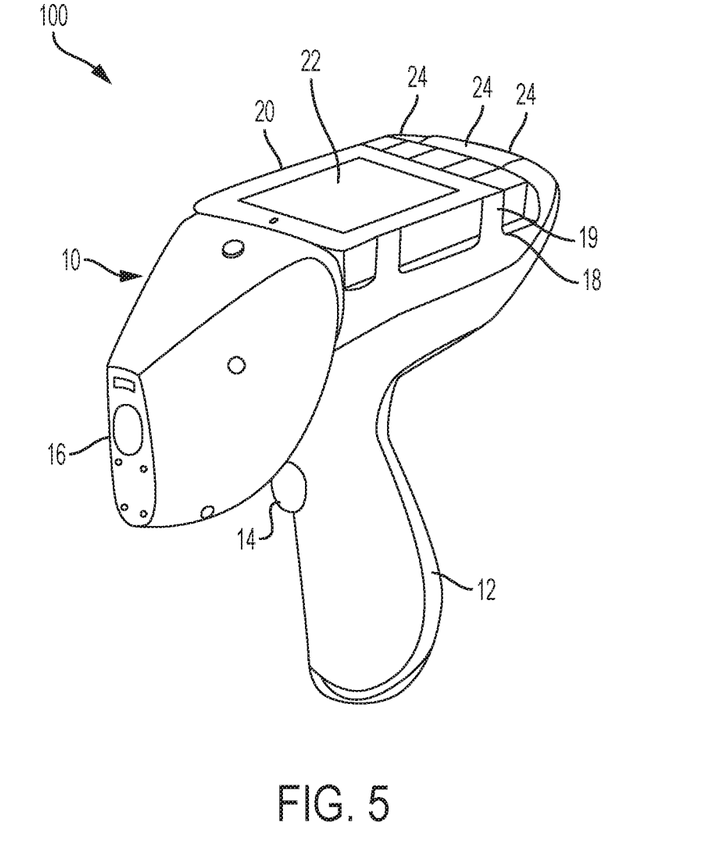
FIG. 5 is an illustration of an embodiment of a hand-held synchronous scan spectrometer.

FIG. 5 illustrates an embodiment of the hand-held synchronous scan spectrometer 100 that incorporates the features of FIG. 1. The spectrometer 100 includes a housing 10 that forms an overall shape of the spectrometer 100 and houses the components of FIG. 1. The housing 10 includes a handle 12, a trigger 14, an optics port 16, and a docking cradle 18. The trigger 14 is positioned on the handle 12 so that a user may activate the spectrometer 100 to analyze a target of interest. In a typical embodiment, actuating the trigger 14 initiates the process described above relative to FIG. 1 by sending a signal to the microcontroller 140. For example, when the trigger 14 is actuated, the microcontroller 140 causes light to be emitted from the optics port 16 on the front of the housing 10 toward a target to be analyzed. Reflected light is also collected via the optics port 16 for analysis by the spectrometer 100.

The embodiment of FIG. 5 includes a removable display device 20 that is docked in the docking cradle 18. The docking cradle 18 serves to removably secure the removable display device 20 to the housing 10. The docking cradle 18 can include various features 19 to help secure the removable display device 20, such as, for example, straps, hook and look fasteners, fingers that grip the removable display device 20, clamping members, and the like. The removable display device 20 may be a mobile device like a cell phone, PDA, tablet, and the like. The removable display device 20 allows a user to view and set parameters of the spectrometer 100 to perform a desired in situ analysis. The parameters may be input by directly interacting with a display 22 of the removable display device 20 (e.g., via touch) or via one or more buttons 24 that allow a user to input selections. The removable display device 20 includes the display 22 and processing hardware (e.g., CPU, memory, and the like) to enable analysis of the target of interest. Utilizing the display 22 and processing hardware of the removable display device 20 reduces the cost of the spectrometer 100.

The removable display device 20 can communicate with the spectrometer 100 via a wired or wireless connection. For example, the removable display device 20 may communicate with the detector 136, stepping motor 138, and the microcontroller 140. In some embodiments, the removable display device 20 can provide instructions to and receive data from one or more of the detector 136, the stepping motor 138, and the microcontroller 140. In some embodiments, the removable display device 20 only receives data from the spectrometer 100. The data may include raw data output by the detector 136.

The wired connection may be, for example, achieved via USB or other proprietary connection between the spectrometer 100 and the removable display device 20. Mobile devices commonly have USB or other ports located on a bottom portion of the mobile device. A corresponding connector may be located within the docking cradle 18 to form the wired connection between the spectrometer 100 and the removable display device 20. In some embodiments, the wired connection can be achieved by a cable that connects at a first end to a port of the removable display device 20 and at a second end to a port of the spectrometer 100. The wireless connection may be, for example, achieved using a known wireless communications protocol (e.g., Bluetooth, WIFI, and the like). The spectrometer 100 may include a radio module that is connected to the microcontroller 140 to permit 2-way communications with a radio module of the removable display device 20.

Figure 6:
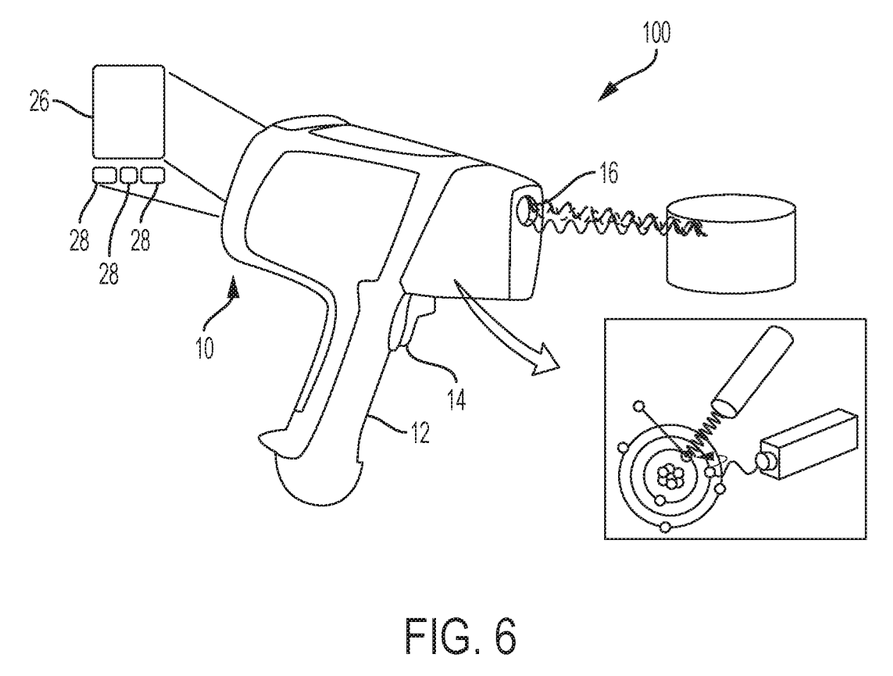
FIG. 6 is an illustration of an embodiment of a hand-held synchronous scan spectrometer.

FIG. 6 illustrates an embodiment of the hand-held synchronous scan spectrometer 100 that incorporates the features of FIG. 1. The embodiment of FIG. 6 is similar to the embodiment of FIG. 5, but operates without the removable display device 20. The spectrometer 100 of FIG. 6 includes the housing 10 that forms an overall shape of the spectrometer 100 and houses the necessary features of FIG. 1. The housing 10 includes the handle 12, the trigger 14, the optics port 16, and a display 26. In contrast to the embodiment of FIG. 5, the embodiment of FIG. 6 includes the display 26 that allows a user to view and set parameters of the spectrometer 100 to perform a desired in situ analysis. The parameters may be input by directly interacting with the display 26 (e.g., via touch) or via one or more buttons 28 that allow a user to input selections. In some embodiments, the spectrometer 100 of FIG. 6 includes an X-ray tube that emits X-rays towards the target of interest.

Figure 7:
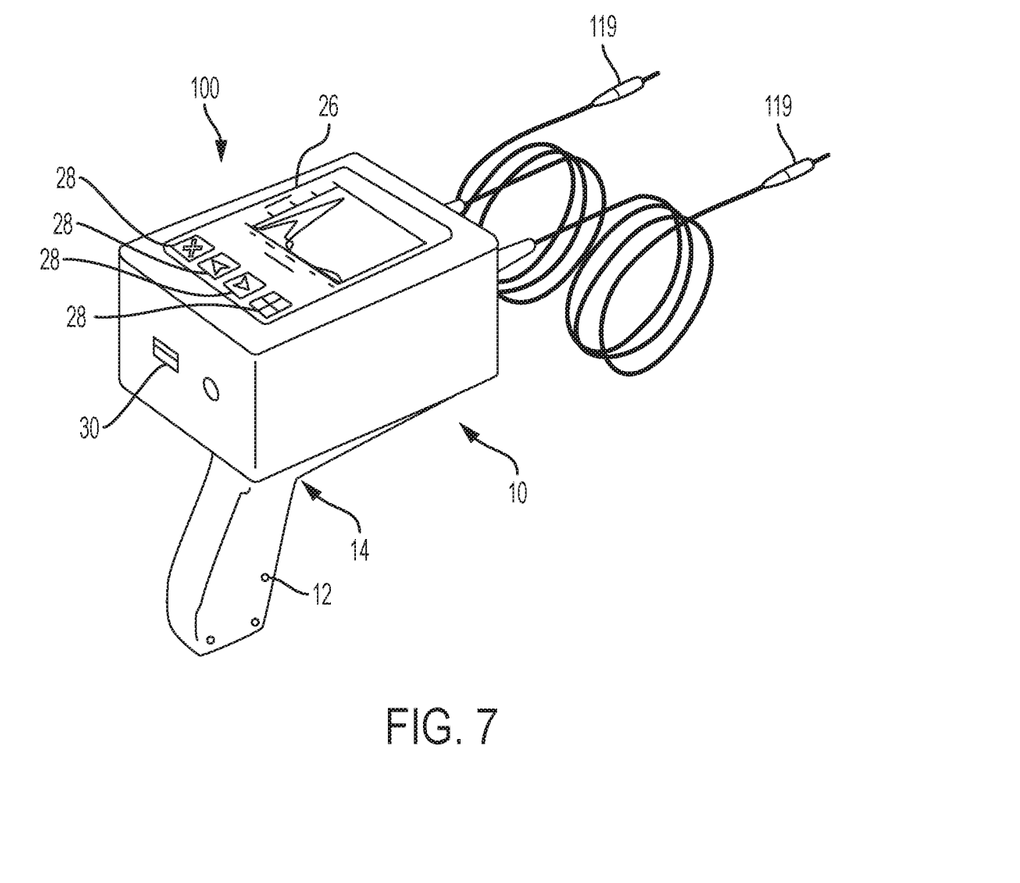
FIG. 7 is an illustration of an embodiment of a hand-held synchronous scan spectrometer.
Figure 8:
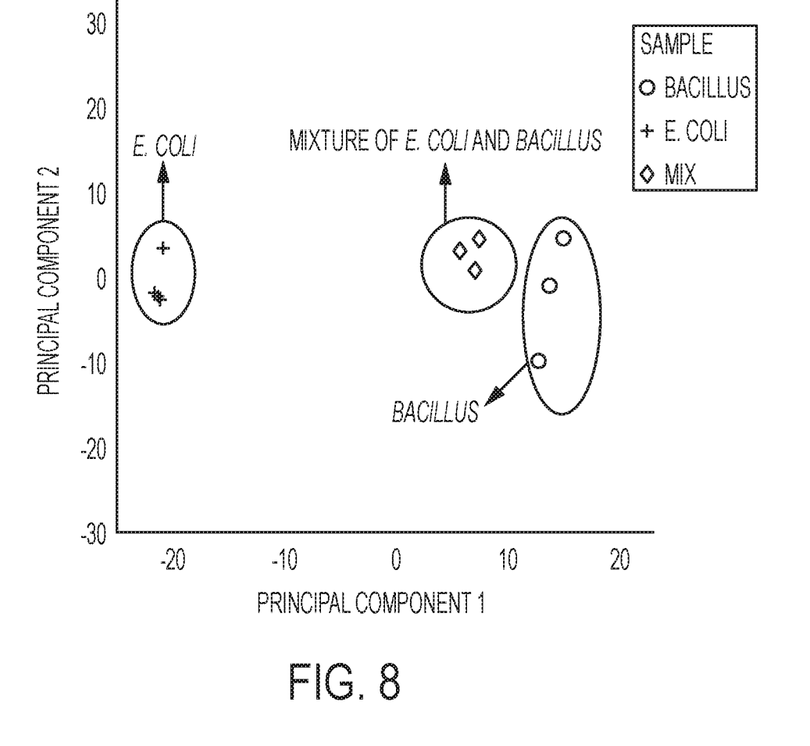
FIG. 8 is a graph showing fluorescence spectra at 340-650 nm of *Bacillus, E. coli*, and their mixture in saline after PCA, excited at 320 nm.
Figure 9:
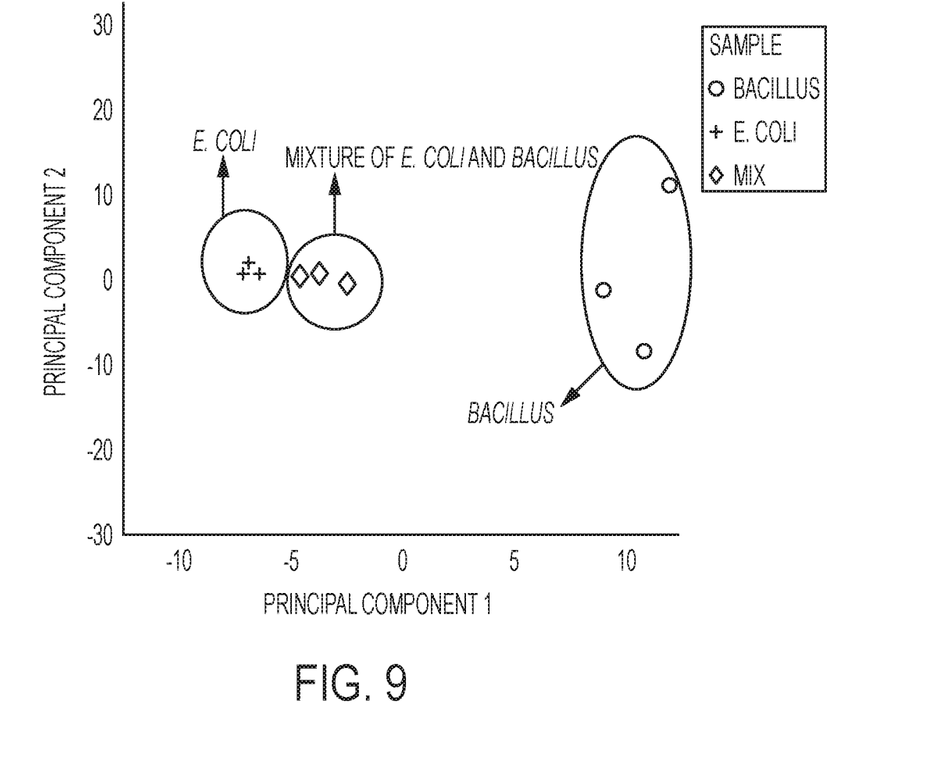
FIG. 9 is a graph showing fluorescence spectra at 340-500 nm of *Bacillus, E. coli*, and their mixture in saline after PCA, excited at 320 nm.

FIG. 7 illustrates an embodiment of the hand-held synchronous scan spectrometer 100 that incorporates the features of FIG. 1. The embodiment of FIG. 7 is similar to the embodiment of FIG. 6 and includes the display 26 integrated into the housing 10. The spectrometer 100 of FIG. 7 additionally includes a data port 30 and one or more of the optical fibers 119. The data port 30 may be used to transfer data to and from the spectrometer 100 and may be included in various embodiments of the spectrometer 100 as desired. For example, the data port 30 may be used to load software onto the spectrometer 100, provide updates to the spectrometer 100, input patient information, input test parameters, download patient data, and download test results.

The one or more optical fibers 119 transmit light from the spectrometer 100 to targets of interest and receive light from targets of interest and direct the light to the spectrometer 100 to permit the spectrometer 100 to perform analysis of the samples as discussed herein. The optical fibers 119 may be included with the embodiments of FIGS. 5 and 6 (e.g., the optical fibers 119 may interact with the optics port 16 to guide light into and out of the spectrometer 100.

Identifying Bacteria from a Mixture

Figure 10:
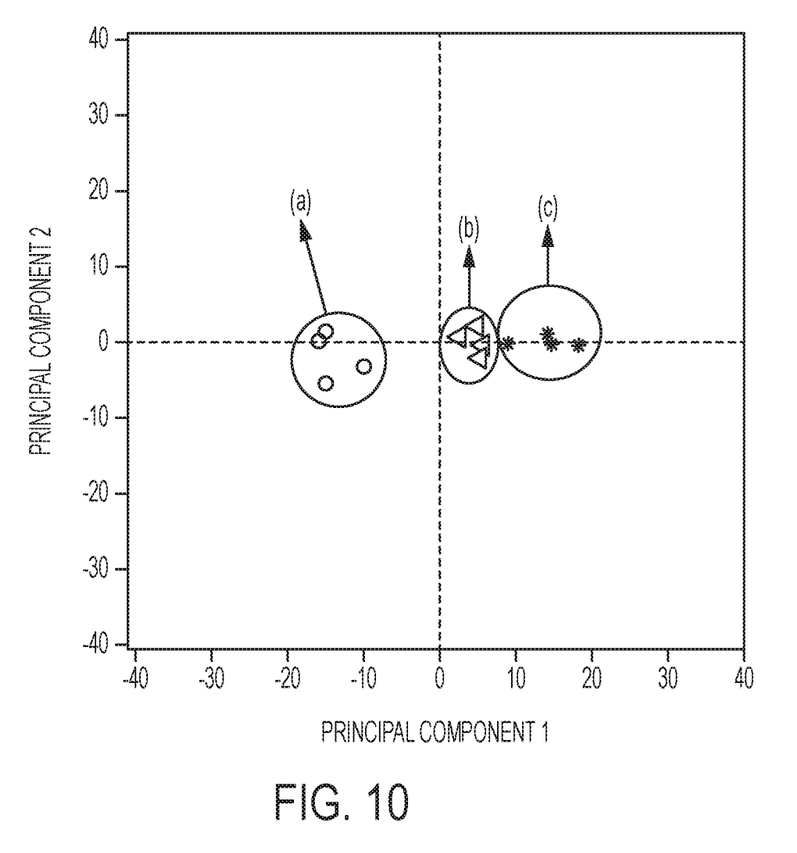
FIG. 10 is a graph showing PCA coordinates showing separation of irradiated and non-irradiated *E. coli* as a function of irradiation time.
Figure 11:
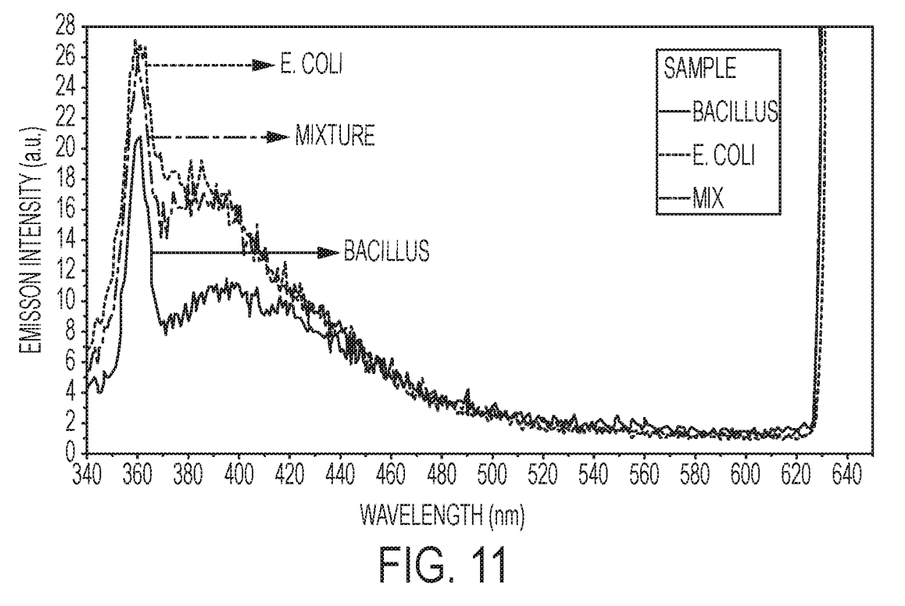
FIG. 11 is a graph showing fluorescence spectra of *Bacillus, E. coli*, and the mixture used for generating FIG. 8 (PCA to identify *Bacillus* in a mixture), excited at 320 nm.
Figure 12:
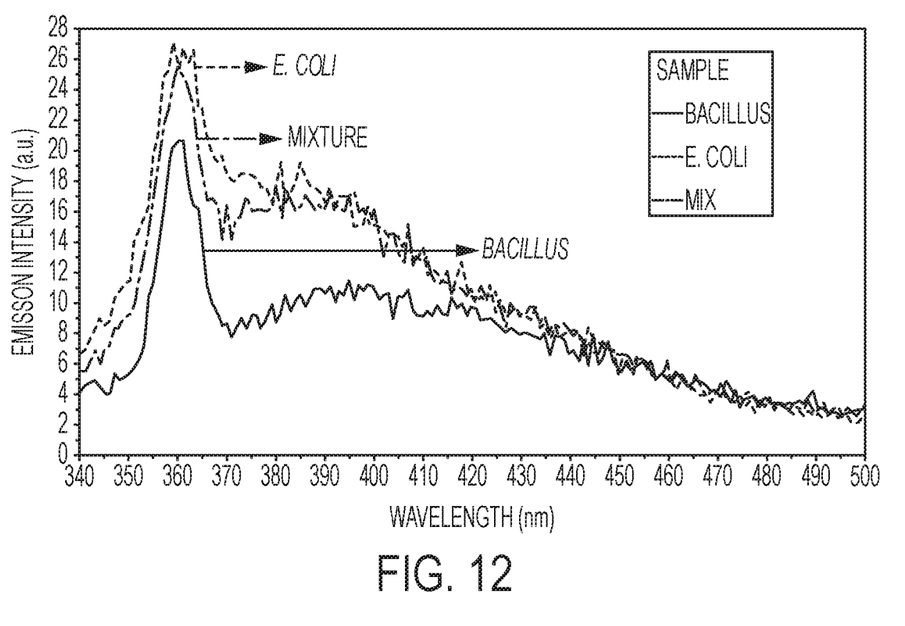
FIG. 12 is a graph showing fluorescence spectra of *Bacillus, E. coli*, and the mixture used for generating FIG. 9 (PCA to identify *E. coli* in a mixture), excited at 320 nm.

To establish the identity of a bacterium in a mixture of two or more bacteria, fluorescence spectra were recorded and analyzed with Principal Component Analysis (PCA). The fluorescence spectra of *Bacillus thuringiensis, Escherichia coli* alone and in a mixture of both in saline were measured in triplicate by exciting the samples at 320 nm. The fluorescence spectra of the two bacteria, excited at 320 nm, were separated by applying PCA as shown in FIG. 8. It was observed that the fluorescence spectra of the mixture tended to cluster near either the *E. coli* spectra or the *B. thuringiensis* spectra depending on the parameters used, thereby depicting the presence of both bacteria in the mixture. When PCA was performed on the fluorescence spectra of the mixture, the presence of *B. thuringiensis* and *E. coli* became evident by the separation of each bacterial spectra. Two of the spectra of *E. coli* overlap and appear as a single point. The number of points represents the number of spectra used for this PCA analysis. FIG. 11 is a graph showing fluorescence spectra of *B. thuringiensis, E. coli*, and the mixture used for generating FIG. 8 (PCA to identify *Bacillus* in 10 a mixture), excited at 320 nm.

FIG. 9 is a graph showing fluorescence spectra at 340-500 nm of *B. thuringiensis, E. coli*, and their mixture in saline after PCA, excited at 320 nm. Two of the spectra of *E. coli* overlap and appear as a single point. The number of points represents the number of spectra used for this PCA analysis. FIG. 12 is a graph showing fluorescence spectra of *Bacillus., E. coli*, and the mixture used for generating FIG. 9 (PCA to identify *E. coli* in a mixture), excited at 320 nm.

Distinguishing Live Bacteria from Dead

To distinguish live bacteria from dead bacteria, the fluorescence spectra were analyzed by PCA. Fluorescence spectra were recorded by exciting the sample at 270 nm, in contrast to exciting at 320 nm that was used to distinguish bacteria, in a 1 cm optical path quartz cuvette before and after irradiation. Samples before irradiation and after each irradiation were cultured to determine the colony forming unit counts.

The spectra obtained were subjected to PCA over the fluorescence wavelength range of 300-550 nm and the spectra were thus, separated from each other as a function of irradiation time. The experiments were performed multiple times and the spectra obtained were treated as duplicates for PCA. FIG. 10 shows the separation of live and dead *E. coli* spectra. The spectra before irradiation (0 minutes) cluster together. After about 5 minutes of irradiation, the live bacterial population falls from 107 cfu/ml to 102 cfu/ml. The spectra obtained at this point lie between the spectra obtained before irradiation and after 22 minutes of irradiation. In FIG. 10, (a) indicates spectra obtained before irradiation representing 100% viable bacteria; (b) indicates spectra obtained after 5 minutes of irradiation representing less than 1% viable bacteria; and (c) indicates spectra obtained after 22 minutes of irradiation representing 0% viable bacteria. Four spectra were used for each irradiation interval. The duplicate spectra overlap and may appear as a single point. The number of points represents the number of spectra used for PC analysis.

After 22 minutes of irradiation no growth of bacteria was observed by culturing, hence this bacteria suspension was considered as non-viable. The spectra obtained at this point of irradiation cluster together, representing dead/non-viable bacteria.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A device comprising:
    a housing capable of being hand-held, wherein the housing includes:
    an excitation monochromator, wherein the excitation monochromator is configured to output a selected excitation wavelength of light at least via a first diffraction grating and within a range of excitation wavelengths and is further configured to transmit the selected excitation wavelength of light to a sample external to the housing;
    an emission monochromator, wherein the emission monochromator is configured to receive emitted light from the sample, and wherein the emission monochromator at least includes a second diffraction grating configured to generate dispersed light in response to the emitted light received at the second diffraction grating;
    a detector configured to receive the dispersed light from the second diffraction grating and further configured to generate spectral data based on the dispersed light; and
    a controller communicatively coupled to the excitation monochromator and communicatively coupled to the emission monochromator, wherein the controller is configured to determine a synchronous emission intensity based, at least in part, on the spectral data, wherein the controller is further configured to perform principal component analysis (PCA) based on the spectral data, wherein the device further includes a display communicatively coupled to the housing, wherein the display is configured to generate a graphical user interface (GUI) depicting a three dimensional fluorescence spectral plot indicative of amino acids of the sample, a two dimensional fluorescence spectral plot indicative of the amino acids of the sample, or both a three dimensional fluorescence spectral plot and a two dimensional fluorescence spectral plot indicative of the amino acids of the sample.

2. The device of claim 1, wherein the display is configured to generate a GUI depicting a three dimensional fluorescence spectral plot indicative of amino acids of the sample.

3. A method comprising:
    generating spectral data at a hand-held spectrometer, wherein generating the spectral data comprises:
    outputting, via a first diffraction grating of the hand-held spectrometer, a selected excitation wavelength of light within a range of excitation wavelengths;
    directing the outputted selected excitation wavelength of light toward a sample external to the hand-held spectrometer, wherein the sample fluoresces in response to the selected excitation wavelength of light;
    receiving, at a second diffraction grating of the hand-held spectrometer, light emitted by the sample to generate dispersed light; and
    recording spectral data at a detector of the hand-held spectrometer, the spectral data generated in response to dispersed light received from the second diffraction grating of the hand-held spectrometer; and
    determining a synchronous emission intensity, at a controller of the hand-held spectrometer, wherein the synchronous emission intensity is based, at least in part, on the spectral data; and
    in response to the recorded spectral data, generating, at the controller, principal component analysis (PCA) data corresponding to the sample,
    wherein the method further comprises generating a fluorescence spectral plot based on the spectral data, the fluorescence spectral plot including a plurality of peaks, each peak corresponding to a particular amino acid of the sample, and wherein generating the spectral data at the hand-held spectrometer further comprises:
    generating, via an ultraviolet light emitting diode (LED) positioned within the hand-held spectrometer, the range of excitation wavelengths;
    transmitting, via optics, the selected excitation wavelength of light to an exit slit of the excitation monochromator, wherein the optics and the first diffraction grating are positioned within an excitation monochromator of the hand-held spectrometer; and
    transmitting the selected excitation wavelength of light to the sample.

4. The method of claim 3 wherein transmitting the selected excitation wavelength of light to the sample comprises passing the selected excitation wavelength of light through a fiber optic cable coupled with a lens to the sample.

5. A method comprising;
    generating spectral data at a hand-held spectrometer, wherein generating the spectral data comprises:
    outputting, via a first diffraction grating of the hand-held spectrometer, a selected excitation wavelength of light within a range of excitation wavelengths;

directing the outputted selected excitation wavelength of light toward a sample external to the hand-held spectrometer, wherein the sample fluoresces in response to the selected excitation wavelength of light;

receiving, at a second diffraction grating of the hand-held spectrometer, light emitted by the sample to generate dispersed light; and recording spectral data at a detector of the hand-held spectrometer, the spectral data generated in response to dispersed light received from the second diffraction grating of the hand-held spectrometer; and determining a synchronous emission intensity, at a controller of the hand-held spectrometer, wherein the synchronous emission intensity is based, at least in part, on the spectral data; and in response to the recorded spectral data, generating, at the controller, principal component analysis (PCA) data corresponding to the sample, wherein the method further comprises:

rendering at least one of a two dimensional spectrum and a three dimensional spectrum at a graphical user interface (GUI) of the hand-held spectrometer based on the recorded spectral data; and indicating, through the GUI, a ratio of dead pathogens to live pathogens in the sample.

6. A method for identifying bacterial strains, fungi and/or viruses of a sample in situ, the method comprising using a hand-held spectrometer that includes a radiation source, a first component positioned to receive light from the radiation source and operable to direct a range of wavelengths of light from the radiation source towards the sample, a second component positioned to receive fluoresced light from the sample, and a detector positioned to receive light output from the second component, to:
  (i) excite the sample with radiation causing it to fluoresce;
  (ii) receive light emitted by the sample at a diffraction grating of he second component to generate dispersed light;
  (iii) record spectral data at the detector, the spectral data generated in response to the dispersed light received from the diffraction grating of the second component; and
  (iv) generate a fluorescence spectral plot based on the spectral data, the fluorescent spectral plot made up of a plurality of peaks, among which are peaks that correspond to the bacterial strains, fungi and/or viruses of the sample, wherein the method further comprises in response to the recorded spectral data, using the hand-held spectrometer to generate, at a controller, principal component analysis (PCA) data corresponding to the sample, and wherein the method further comprises using the hand-held spectrometer to render at least one of a two dimensional spectrum and a three dimensional spectrum at a graphical user interface (GUI) of the hand-held spectrometer based on the recorded spectral data; and indicating, through the GUI, a ratio of dead pathogens to live pathogens in the sample.

7. A method for identifying bacterial strains, fungi and/or viruses of a sample in situ, the method comprising using a hand-held spectrometer that includes a light emitting diode (LED) positioned to direct a range of wavelengths of light towards the sample, a component positioned to receive fluoresced light from the sample, and a detector positioned to receive light output from the component, to:
  (i) excite the sample with radiation causing it to fluoresce;
  (ii) receive light emitted by the sample at a diffraction grating of the component to generate dispersed light;
  (iii) record spectral data at the detector, the spectral data generated in response to the dispersed light received from the diffraction grating of the component, and (iv) generate a fluorescence spectral plot based on the spectral data, the fluorescent spectral plot made up of a plurality of peaks, among which are peaks that correspond to the bacterial strains, fungi and/or viruses of the sample, wherein the method further comprises in response to the recorded spectral data, using the hand-held spectrometer to generate, at a controller, principal component analysis (PCA) data corresponding to the sample, and which wherein the method further comprises using the hand-held spectrometer to render at least one of a two dimensional spectrum and a three dimensional spectrum at a graphical user interface (GUI) of the hand-held spectrometer based on the recorded spectral data; and indicating, through the GUI, a ratio of dead pathogens to live pathogens in the sample.

8. A device comprising:

a housing capable of being hand-held, wherein the housing includes:

an excitation monochromator, wherein the excitation monochromator is configured to output a selected excitation wavelength of light at least via a first diffraction grating and within a range of excitation wavelengths and is further configured to transmit the selected excitation wavelength of light to a sample external to the housing;

an emission monochromator, wherein the emission monochromator is configured to receive emitted light from the sample, and wherein the emission monochromator at least includes a second diffraction grating configured to generate dispersed light in response to the emitted light received at the second diffraction grating;

a detector configured to receive the dispersed light from the second diffraction grating and further configured to generate spectral data based on the dispersed light; and a controller communicatively coupled to the excitation monochromator and communicatively coupled to the emission monochromator, wherein the controller is configured to determine a synchronous emission intensity based, at least in part, on the spectral data, wherein the controller is further configured to perform principal component analysis (PCA) based on the spectral data, wherein the device further includes a display communicatively coupled to the housing, wherein the display is configured to generate a graphical user interface (GUI) depicting at least one of a two-dimensional spectrum and a three-dimensional spectrum based on the generated spectral data, and wherein the GUI is further configured to indicate a ratio of dead pathogens to live pathogens in the sample.

\* \* \* \* \*